United States Patent Office 2,755,300
Patented July 17, 1956

2,755,300

PRODUCTION OF SATURATED ALIPHATIC NITRILES FROM ALDEHYDES AND IMINES PREPARED THEREFROM

Benjamin Thompson, Kingsport, Tenn., assignor to Eastman Kodak Company, Rochester, N. Y., a corporation of New Jersey No Drawing. Application April 23, 1952,
Serial No. 283,971

4 Claims. (Cl. 260—465.1)

The present invention relates to the preparation of saturated aliphatic nitriles and to the synthesis of intermediates useful in the production thereof. More specifically the invention is concerned with the conversion into saturated aliphatic nitriles of saturated aliphatic aldehydes, their aldol condensation products, unsaturated aldehydes prepared from the latter, other unsaturated aldehydes, and unsaturated aldimines prepared from any of said aldehydes and said condensation products. In one of its most important embodiments the invention relates to the synthesis from straight chain saturated aliphatic aldehydes or unsaturated aliphatic aldehydes prepared by aldol condensation and dehydration of said straight chain saturated aliphatic aldehydes, of branched chain ($\alpha$-substituted) saturated aliphatic nitriles containing twice the number of carbon atoms as contained in said saturated aldehydes.

The production of unsaturated nitriles from unsaturated or saturated aldehydes is the subject of U. S. Patent No. 2,412,437. My copending U. S. Patent application, Serial No. 195,899, filed November 15, 1950, now abandoned, relates to the preparation of aliphatic nitriles particularly saturated aliphatic nitriles from aliphatic aldehydes and ammonia, employing silver-zinc catalysts.

From the above and other art it is evident that one method for preparing a relatively higher $\alpha$-substituted saturated nitrile from a relatively lower unsubstituted (i. e. straight chain) saturated aldehyde resides in the following steps:

1. Saturated lower aldehyde (A) $\longrightarrow$ aldol condensation aldol

2. Aldol $\xrightarrow{-H_2O}$ unsaturated higher aldehyde (B)

3. Unsaturated higher aldehyde (B) $\xrightarrow{+H_2}$ saturated higher aldehyde (B)

4. Saturated higher aldehyde (B) $\xrightarrow{+NH_3}$ corresponding saturated nitrile $+H_2$ In accordance with the four-step process suggested above, propionaldehyde for instance would be converted to 2-methylpentenal, which then would be hydrogenated to $\alpha$-methylvaleraldehyde. The latter would be converted by reaction with ammonia to $\alpha$-methylvaleronitrile. These reactions may be represented by the following equations:

1.
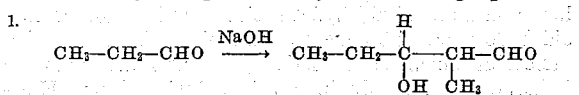

2.
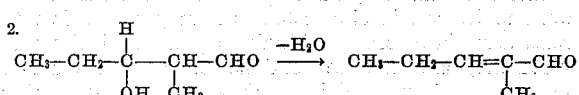

3.
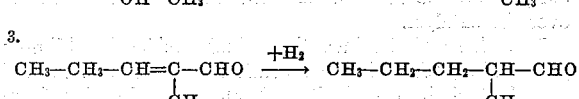

4.
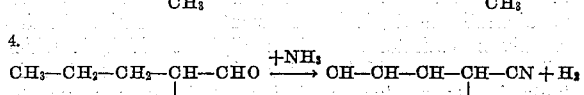

It is obvious that it would be quite advantageous to eliminate the step of hydrogenation (step 3) if adequate results could be obtained without it, since hydrogenation is a costly procedure in commercial practice. It also is obvious that a reduction in the number of steps required to convert the saturated lower aldehyde to the higher $\alpha$-substituted saturated nitrile would be beneficial as a practical matter.

I have found that the prior four-step method may be accomplished in two simplified operations whereby the costly step of hydrogenation may be obviated. This is achieved by forming from the saturated lower aldehydes in a single liquid phase conversion unsaturated imines of the higher unsaturated $\alpha$-substituted aldehyde. In an abbreviated second step the unsaturated branched chain imine, through reaction with ammonia in vapor phase over proper catalysts, is both hydrogenated to a saturated imine and dehydrogenated to a nitrile. This is possible since it is feasible to employ for the production of nitriles from imines and ammonia catalysts which are hydrogenation as well as dehydrogenation catalysts. Thus, in effect the unsaturated imine serves as its own hydrogen acceptor.

Accordingly an important object of the present invention is to provide a new process by which the costly hydrogenation step may be avoided. A second important object concerns a method of carrying out the aldol condensation, dehydration and imine formation as a single step. Thus it is an object of the invention to provide a new process for the preparation of saturated aliphatic nitriles, more specifically a process whereby saturated aliphatic nitriles may be prepared in a two-step procedure from lower saturated aldehydes. Another object is to prepare branched chain ($\alpha$-substituted) aliphatic nitriles. A further object is the preparation of branched chain ($\alpha$-substituted) aliphatic nitriles from saturated straight chain aldehydes. Still another object is the preparation of saturated aliphatic nitriles containing twice the number of carbon atoms as the saturated aliphatic aldehyde starting material used for their preparation. A still further object is the provision of a method for preparing saturated aliphatic nitriles from unsaturated aldehydes of the same number of carbon atoms, and the provision of a method for the preparation of such nitriles from imines, specifically unsaturated imines. Another object concerns the preparation of unsaturated imines from saturated aliphatic aldehydes of fewer carbon atoms. Another object relates to the preparation of unsaturated branched chain ($\alpha$-substituted) normally-liquid imines useful for the preparation of saturated aliphatic nitriles. Still another object of the invention is to provide new imine compounds. Another object concerns the preparation of nitriles from imines prepared from the products of an aldol condensation and the synthesis of aliphatic nitriles by the vapor phase catalytic reaction of ammonia with products of aldol condensation of aliphatic aldehydes and their imines. Another object relates to the preparation of $\alpha$-methylvaleronitrile and similar saturated lower aliphatic nitriles having an $\alpha$-substituted substituent.

Still other objects of the invention are the elimination of the expensive purification steps and avoidance of use of strong base catalysts for the aldol condensation, both of which are necessary to the above-described four-step process.

A still further object of the invention is to provide a new aldimine compound having the empirical formula $C_9H_{15}N$ which upon hydrolysis reverts to one molecule of propionaldehyde and one molecule of 2-methylpentenaldehyde. This compound is believed to have the structure:

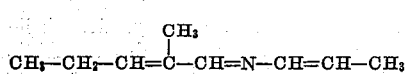

Additional objects will be evident from the following specification and claims.

In accordance with my invention saturated straight chain aliphatic aldehydes of three or more carbon atoms are employed to prepare saturated branched chain (α-substituted) higher aliphatic nitriles containing a main chain of six or more carbon atoms. In general it may be said that the process comprises the steps of:

1. Reacting a saturated aliphatic aldehyde with aqueous ammonia and recovering from the reaction products an unsaturated branched chain aldehyde imine containing a multiple of the number of carbon atoms of the aldehyde starting material.

2. Passing the unsaturated imine with ammonia over a catalyst at an elevated temperature to thereby produce a branched chain saturated aliphatic nitrile containing twice the number of carbon atoms as the starting aldehyde.

This represents the preferred embodiment in terms of which the invention will be explained. However, various modifications which do not fall within the definition given above will be apparent in the present disclosure and are not to be excluded from the inventive concept. One of these modifications, for instance, is that wherein a starting mixture of acetaldehyde and propionaldehyde is employed to prepare a five carbon atom nitrile through the intermediate imine of tiglic aldehyde (i. e. dimethyl acrolein). Thus, a generic process in accordance with the invention provides for the preparation of nitriles corresponding to the imines of α,β-alkyl-disubstituted acroleins, that is saturated aliphatic branched chain (α-substituted) nitriles of five or more carbon atoms.

1.
$$CH_3—CH_2—CHO + NH_3 \longrightarrow$$

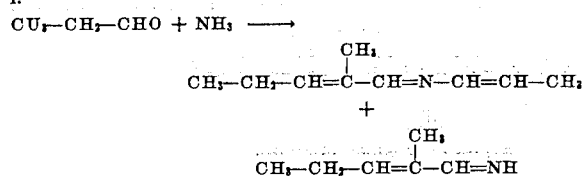

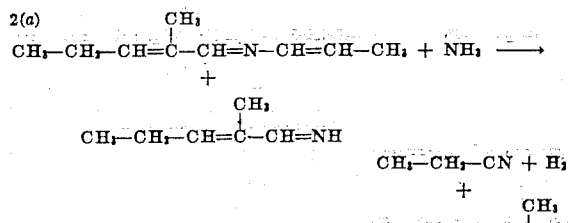

(b)

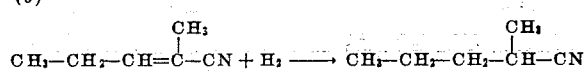

It is possible that hydrogen is never actually split out of the nitrile in the reaction 2(a) and added again in reaction 2(b) but that instead rearrangement takes place to form the saturated nitrile.

In consonance with the main inventive concept outlined above, other embodiments of the invention comprise the step of converting as alternative starting materials, intermediates of the above process, i. e. unsaturated branched chain (α-substituted) aldehydes and imines thereof to saturated branched chain (α-substituted) nitriles of the same number of carbon atoms by means of imine hydrogenation and dehydrogenation carried out in the vapor phase.

It will be apparent that the process is useful primarily for the production of saturated aliphatic branched chain (α-substituted) nitriles having a main chain of five or more carbon atoms, e. g. α-methylvaleronitrile, α-ethylcapronitrile, etc. However, a number of additional products result as byproducts of the reaction, generally in minor amounts. Where the initial starting material is propionaldehyde for example, substantial portions of 2-methyl 2-pentenonitrile will be recovered along with propionitrile and unconverted imines.

Other aliphatic alkyl nitriles which may be prepared appropriately by means of the instant process include α-propylenanthonitrile, α-butylcaprylonitrile, α-methylbutyronitrile, α-methylcapronitrile, α-ethylvaleronitrile, etc.

Where the teachings of the presents invention are utilized for the preparation of saturated aliphatic nitriles by a two-step procedure starting with saturated unsubstituted sraight chain aliphatic aldehydes and going through an intermediate phase of aldol condensation and formation of unsaturated aliphatic aldimines, it is obvious that the nitriles produced will always have an even number of carbon atoms, which number is twice that of the lower aldehyde starting material except when a mixture of lower aldehydes is used as starting material. In the latter event, some odd number carbon atom product may result. It further is apparent that the nitriles will have a branched chain if the aldehyde starting material is propionaldehyde or a higher aliphatic straight chain aldehyde. The lower aldehydes, i. e. formaldehyde and acetaldehyde may be said to be generally inoperative since formaldehyde does not undergo the usual aldol condensation and dehydration, and acetaldehyde may undergo conversion to crotonaldehyde which latter usually behaves peculiarly in reaction with ammonia as further discussed below. However, it is likely that acetaldehyde may function within the terms of the invention to produce some of the unsaturated higher imine under optimum conditions.

In other embodiments of the invention intermediate aldehydes which need not pass through aldol formation and dehydration may be employed as starting material. Thus the chosen aldehyde starting material may be an unsaturated branched chain (substituted at the α carbon) aliphatic aldehyde which is converted to the corresponding unsaturated imine which is in turn hydrogenated and dehydrogenated to the corresponding saturated branched chain aliphatic nitrile. In this case it is clear that the resulting nitrile in accordance with the invention will have the same number (rather than twice the number) of carbon atoms as the aldehyde starting material and this number of course is not necessarily an even number. By the same token, the resulting nitrile will have a chain identical with that of the starting material. Thus, the inventive concept comprising this embodiment resides in the liquid phase preparation of an unsaturated aldimine of the unsaturated starting material and subsequent hydrogenation-dehydrogenation of the imine to form a nitrile corresponding to the aldehyde starting material but having a paraffinic linkage where the original aldehyde or imine has an olefinic linkage. By means of this embodiment, saturated nitriles of relatively fewer carbon atoms and/or having odd numbers of carbon atoms may be prepared. For instance, valeronitrile may be prepared from 2-penten-1-al. However, as indicated above, the lower unsaturated aldehydes such as acrolein and crotonaldehyde react with aqueous ammonia to form very high molecular weight condensation products rather than the imines containing only three or less alkyl radicals. However, under certain circumstances it may be possible to react acrolein or crotonaldehyde to produce nitriles provided they are vaporized and heated close to reaction temperature before mixing with ammonia and passing over the catalyst.

The phase of the invention which resides in aldimine preparation, that is, preparation of an unsaturated branched chain (α-substituted) aliphatic aldimine from an aliphatic aldehyde is somewhat more flexible in that it only necessitates use of an aliphatic aldehyde which will undergo an aldol condensation and subsequent dehydration to produce an imine relatively more unsaturated and having a relatively more-branched chain, the imine being of an even number of carbon atoms which is a multiple of the number of carbon atoms contained in the starting aldehyde, except for the possibilities when mixed aldehydes are used as starting materials.

The higher nitriles which can be prepared by the process of the invention are useful as organic intermediates and certain of them may be employed as modifiers or solvents for certain commercially important nitrile polymers.

As indicated above, it may be possible to react acetaldehyde with aqueous ammonia and vaporize the product with excess ammonia over a catalyst and thereby produce n-butyronitrile and acetonitriles. However, this reaction involving a short chain saturated aldehyde is not considered to be within the more preferred embodiment of the invention as discussed in connection with saturated aldehydes of three or more carbon atoms.

As indicated above it is in keeping with the concept of this invention to practice nitrile preparation starting with a normally liquid imine, particularly an unsaturated imine, preferably of a branched chain ($\alpha$-substituted) and utilizing step 2 only of the process. Where this embodiment is employed suitable imine starting material, depending upon the particular nitrile which it is desired to produce, includes imines such as:

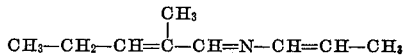

In step 2 of the process, e. g. conversion of the unsaturated imine to the saturated nitrile, the ammonia should be employed in excess of the theoretical amount required. As will be noted from the examples given below the optimum mole ratio of ammonia to imine is in the range of about 2 to 1 to 4 to 1.

The hydrogenation-dehydrogenation of the imine is accomplished by contacting a preferably preheated gaseous mixture of the ammonia and imine with an appropriate hydrogenation-dehydrogenation catalyst maintained at a temperature in the range of about 250° C. to 500° C. preferably about 325° C. to 400° C. for a period in the range of about 0.01 to 2.0 seconds at an appropriate space velocity, e. g. 300 or 350.

The ammonia and imine may be mixed before reaching or within the catalyst bed, any of a number of suitable procedures standard to the catalytic vapor phase preparation of nitriles being appropriate. Diluents may be employed where desirable in accordance with effective procedures well-known in the art. Diluents may be aptly utilized to supply some of the heat required for the reaction and/or to facilitate control of temperature in the reaction zone (catalyst bed).

The aldol condensation phase of the imine formation takes place in the presence of aqueous ammonia with suitably an equimolar proportion of reactants. The aqueous ammonia advantageously may be of a concentration within the range of 1 to 30%, although the concentration of ammonia is not critical as long as an excess is present. Normally no extraneous catalyst is required and the ammonia serves also to supply the necessary reactant for conversion of the free aldehyde group to form the imine. Imine formation apparently takes place through an intermediate aldehyde-ammonia which is dehydrated in the course of the reaction, the reaction mixture being maintained at a temperature suitably in the range of 30–80° C. The imine hydrogen may condense with another carbonyl group to form N-substituted polyalkyl imines or alkenyl imines together with simple aldimines which separate as a water insoluble layer.

Any number of suitable hydrogenation-dehydrogenation catalysts may be employed for conversion of the imine to nitrile. However it has been determined that two metal catalysts, to wit copper-zinc and silver-zinc, are particularly advantageous. These catalysts and methods for their preparation are per se known to the art. See for instance, my aforementioned application.

The active catalytic material may of course be employed in conjunction with suitable inert or active supporting material and/or suitable promoters where desired.

*Example 1*

Thirty moles of propionaldehyde were fed into 33 moles of 10% ammonium hydroxide with cooling at 20° C. The solution was then heated to 75° C. for 1 hour. An insoluble imine layer equal in volume to 85 per cent of the propionaldehyde separated. The aqueous layer was refortified with ammonia and used to react with more propionaldehyde. Alternately, it could be extracted to recover more imine. The crude imine product contained 1 nitrogen for each 4.5 carbon atoms. Distillation separated ammonia, water, propionaldimine, and higher imines. Over 40 per cent of the product was a cut, B. P. 98/50 mm., which upon refluxing with aqueous hydrochloric acid hydrolyzed to give equal moles of propionaldehyde and 2-methylpentenal. Higher cuts also hydrolyzed to produce additional 2-methylpentenal.

*Example 2*

The crude imine product separated in Example 1 was fed with excess ammonia over a copper-zinc catalyst at 350° C. and 300 space velocity. The products were condensed and distilled to produce propionitrile, 2-methylpentenonitrile, 2-methylpentanonitrile, B. P. 135° C./735, and unreacted imines. Analysis showed the $C_6$ nitrile to be mainly the saturated 2-methylpentanonitrile. Some 2-methylpentenonitrile was also produced. If desired the unsaturated nitrile and unreacted imines could be recycled.

*Example 3*

Normal butyraldehyde was fed into an equal molar amount of ammonium hydroxide at 20–30° C, and then warmed to reflux. The mixture of imines of butyraldehyde and 2-ethylhexenaldehyde separated as a top layer. These were decanted and then vaporized in a stream of ammonia gas, and passed over a catalyst composed of 54 per cent silver and 46 per cent zinc. The catalyst was heated to 400° C. A space velocity of 350 was used. Distillation separated normal butyronitrile, 2-ethylhexenonitrile and 2-ethylhexanonitrile. Very little substituted pyridines were produced.

*Example 4*

98 gms. of 2-methylpentenal was reacted with excess aqueous ammonia to produce mixed imines at a 20–80° C. reaction temperature. The mixed imine layer was separated and fed with 70 gms. of ammonia over a copper-zinc catalyst at 325° C. The products were condensed and the organic layer fractionated to isolate 55 gms. of 2-methypentanonitrile ($\alpha$-methylvaleronitrile).

*Example 5*

Normal butyraldehyde was condensed with alkaline catalyst to prepare 2-ethylhexenal. The 2-ethylhexenal was reacted with excess aqueous ammonia to produce mixed imines. These crude imines along with a 3-molar excess of ammonia were passed over a silver-zinc catalyst at 375° C. The products of reaction were condensed. The organic layer was separated and washed free of unreacted imines and amines with dilute acid and then azeotropically distilled. 2-ethylhexanonitrile was obtained in good yield. Analysis for unsaturation showed that very little 2-ethylhexenonitrile is present.

The vapor phase conversion to nitrile takes place at atmospheric pressure, but the reaction suitably may be conducted at increased or decreased pressures and the nitrile products may be separated, recovered and purified in accordance with standard procedures.

The production of nitriles from aldehyde imines is disclosed and claimed in my copending U. S. patent application Serial No. 266,779, filed January 16, 1952, of which the present application is a continuation in part. The prior application also discloses and claims certain imines and methods for the preparation thereof.

I claim:

1. Method for the preparation of a saturated aliphatic nitrile comprising the steps of vaporizing an unsaturated aliphatic primary imine, reacting the thus vaporized imine with an amount of gaseous mmonia in excess of the ratio of one mole of ammonia per mole of the imine, over a dehydrogenation-hydrogenation catalyst selected from the group consisting of copper-zinc and silver-zinc at a temperature in the range of about 250° C. to about 500° C., and recovering saturated nitrile thus produced.

2. Method as defined in claim 1 wherein the primary imine is an alkenyl imine.

3. Method as defined in claim 2 wherein the alkenyl imine is a branched chain imine.

4. Method as defined in claim 3 wherein the branched chain imine has the formula $$CH_3-CH_2-CH=\underset{\underset{CH_3}{|}}{C}-CH=NH$$

References Cited in the file of this patent

UNITED STATES PATENTS

| | | |
|---|---|---|
| 2,388,218 | Olin | Oct. 30, 1945 |
| 2,443,420 | Gresham | June 15, 1948 |
| 2,452,187 | Gresham | Oct. 26, 1948 |
| 2,525,818 | Mahan | Oct. 17, 1950 |
| 2,582,128 | Hurwitz | Jan. 8, 1952 |

OTHER REFERENCES

Mowry: Chemical Reviews, vol. 42, pp. 249–50 (1948).